(12) United States Patent
Kumar

(10) Patent No.: US 11,933,233 B1
(45) Date of Patent: Mar. 19, 2024

(54) EXHAUST PRESSURE PULSE MANAGEMENT METHOD TO RAISE EXHAUST TEMPERATURE AND ENTHALPY IN INTERNAL COMBUSTION ENGINES

(71) Applicant: SAUDI ARABIAN OIL COMPANY, Dhahran (SA)

(72) Inventor: Praveen Kumar, New Hudson, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/192,122

(22) Filed: Mar. 29, 2023

(51) Int. Cl.
| F02D 13/02 | (2006.01) |
| F02D 13/06 | (2006.01) |
| F02D 17/02 | (2006.01) |
| F02D 23/00 | (2006.01) |

(52) U.S. Cl.
CPC ......... F02D 13/0242 (2013.01); F02D 13/06 (2013.01); F02D 17/02 (2013.01); F02D 23/00 (2013.01)

(58) Field of Classification Search
CPC ....... F02D 13/06; F02D 17/02; F02D 13/0234
See application file for complete search history.

(56) References Cited

U.S. PATENT DOCUMENTS

| 7,007,460 | B2 | 3/2006 | Frieden et al. |
| 9,759,125 | B2 | 9/2017 | Baker et al. |
| 9,835,082 | B2 | 12/2017 | VanDerWege |
| 10,180,103 | B2 | 1/2019 | Uehane et al. |

(Continued)

FOREIGN PATENT DOCUMENTS

JP 5849924 B2 2/2016

OTHER PUBLICATIONS

"California 2015 Through 2025 Model Year Criteria Pollutant Exhaust Emission Standards And Test Procedures And 2017 And Subsequent Model Year Greenhouse Gas Exhaust Emission Standards And Test Procedures For Passenger Cars, Light-Duty Trucks, And Medium-Duty Vehicles," Aug. 25, 2022, Retrieved from Internet URL: https://ww2.arb.ca.gov/sites/default/files/2023-02/ldtps_2015_2025_CP_2017%2BGHG_MY_lev_iv_8_22_11-2022.pdf (160 pages).

(Continued)

*Primary Examiner* — Ngoc T Nguyen
(74) *Attorney, Agent, or Firm* — Osha Bergman Watanabe & Burton LLP

(57) ABSTRACT

An engine includes multiple cylinders having at least one deactivated cylinder and at least one activated cylinder, multiple intake valves, wherein each intake valve is positioned in an intake port of each of the cylinders, multiple exhaust valves, wherein each exhaust valve is positioned in an exhaust port of each of the cylinders, and an exhaust pulse valve positioned along an exhaust main passage fluidly connected between a turbine inlet to a turbocharger and the exhaust valves. Methods are disclosed that include deactivating the deactivated cylinders and operating the activated cylinders, while the exhaust pulse valve is actuated by fully opening the exhaust pulse valve when at least one of the multiple exhaust valves to the at least one activated cylinder is open and fully closing the exhaust pulse valve when each of the multiple exhaust valves to the at least one activated cylinder is closed.

20 Claims, 11 Drawing Sheets

(56) References Cited

U.S. PATENT DOCUMENTS

| | | | |
|---|---|---|---|
| 10,428,749 B2 | 10/2019 | Kraemer et al. | |
| 2016/0010594 A1 | 1/2016 | Wu | |
| 2019/0264594 A1* | 8/2019 | Anderson | F02D 41/1448 |

OTHER PUBLICATIONS

"China's Stage 6 Emission Standard for New Light-Duty Vehicles (Final Rule)," International Council on Clean Transportation, Mar. 2017, Retrieved from URL: https://theicct.org/sites/default/files/publications/China-LDV-Stage-6_Policy-Update_ICCT_20032017_vF_corrected.pdf (13 pages).

Deppenkemper et al., "Super Ultra-Low NOx Emissions under Extended RDE Conditions—Evaluation of Light-Off Strategies for Advanced Diesel Exhaust Aftertreatment Systems," SAE Technical Paper 2019-01-0742, Apr. 2, 2019, 7 pages.

"Euro 7 New Proposal for Vehicle Emissions Type Approval in Europe: Presentation at GRPE 87," Jan. 12, 2023, Retrieved from Internet URL: https://unece.org/sites/default/files/2023-01/GRPE-87-37r1e.pdf (22 pages).

Gustavsson, "Unique Cold Start Method Used on Volvo's New 12L Unit Injector Diesel Engine," SAE Technical Paper 940109, Feb. 21-24, 1994, 9 pages.

Harris et al., "Modeling of Close-Coupled SCR Concepts to Meet Future Cold Start Requirements for Heavy-Duty Engines," SAE Technical Paper 2019-01-0984, Apr. 2, 2019, 14 pages.

Kovacs et al., "Modeling Heavy-Duty Engine Thermal Management Technologies to Meet Future Cold Start Requirements," SAE Technical Paper 2019-01-0731, Apr. 2, 2019, 17 pages.

Payri et al., "Study of the Potential of Intake Air Heating in Automotive DI Diesel Engines," SAE Technical Paper 2006-01-1233, Apr. 3-6, 2006, 13 pages.

Sellnau et al., "Pathway to 50% Brake Thermal Efficiency Using Gasoline Direct Injection Compression Ignition," SAE Technical Paper 2019-01-1154, Apr. 9-11, 2019, 23 pages.

Trenc et al., "Influence of the exhaust system design on scavenging characteristic and emissions of a four-cylinder supercharged engine," Journal of Engineering for Gas Turbines and Power, Oct. 2000, vol. 122, pp. 556-561, 6 pages.

* cited by examiner

EXHAUST PRESSURE PULSE MANAGEMENT METHOD TO RAISE EXHAUST TEMPERATURE AND ENTHALPY IN INTERNAL COMBUSTION ENGINES

BACKGROUND

Cylinder deactivation (CDA) is an engine technique used in multi-cylinder engines (e.g., primarily in light-duty transport vehicles) where a combination of cylinders are selectively deactivated. CDA has been used in strategies for improving engine efficiency and fuel economy. In diesel engines, CDA has been used to increase the exhaust gas temperature by increasing the engine-load in the active cylinders. Cylinders are deactivated in CDA techniques by deactivating the intake and exhaust valves for the selected deactivated cylinder.

As an example, under a conventional four-cylinder engine operation, all four cylinders are activated, e.g., via fueling and operating intake and exhaust valves for each cylinder. A CDA technique to the four-cylinder engine may include deactivating fueling and valve motions for cylinders 1 and 4 of the engine by imposing zero fueling and valve lifts for the intake and exhaust valves associated with the cylinders 1 and 4. When cylinders 1 and 4 are deactivated, the load in the active cylinders 2 and 3 are increased by increasing fuel injection quantity through the active cylinders 2 and 3. Thus, by deactivating cylinders in CDA techniques, the remaining active cylinders work harder and produce more heat, which can heat the engine aftertreatment system hotter quicker and reduce emissions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relates to methods of operating an engine that includes multiple cylinders having at least one deactivated cylinder and at least one activated cylinder, multiple intake valves, wherein each intake valve is positioned in an intake port of each of the multiple cylinders, multiple exhaust valves, wherein each exhaust valve is positioned in an exhaust port of each of the multiple cylinders, and an exhaust pulse valve positioned along an exhaust main passage fluidly connected between a turbine inlet to a turbocharger and the multiple exhaust valves. Methods disclosed herein also include deactivating the at least one deactivated cylinder by deactivating each of the multiple intake valves and each of the multiple exhaust valves to each of the at least one deactivated cylinder and operating the at least one activated cylinder by operating each of the multiple intake valves and each of the multiple exhaust valves to each of the at least one activated cylinder according to a valve timing schedule. While the deactivated cylinder(s) are deactivated and the activated cylinder(s) are operating, the exhaust pulse valve is actuated by fully opening the exhaust pulse valve when at least one of the multiple exhaust valves to the at least one activated cylinder is open and fully closing the exhaust pulse valve when each of the multiple exhaust valves to the at least one activated cylinder is closed.

In another aspect, embodiments disclosed herein relate to methods of operating an engine that includes multiple cylinders having multiple pistons, wherein each of the multiple pistons is slidably positioned within each of the multiple cylinders, multiple intake valves, wherein each of the multiple intake valves is positioned in an intake port of each of the multiple cylinders, multiple exhaust valves, wherein each of the multiple exhaust valves is positioned in an exhaust port of each of the multiple cylinders, a crankshaft is connected to each of the multiple pistons, and an exhaust pulse valve positioned along an exhaust main passage fluidly connected between the multiple exhaust valves and a turbine inlet of a turbocharger. While the crankshaft is rotating during a first portion of an engine cycle, the exhaust pulse valve is kept in a fully open position to allow exhaust flow from the multiple cylinders to the turbocharger, and while the crankshaft is rotating during a remaining portion of the engine cycle, the exhaust pulse valve is kept in a fully closed position to block the exhaust flow from the multiple cylinders.

In yet another aspect, embodiments disclosed herein relate to an engine that includes a turbocharger, multiple cylinders, wherein each cylinder has a combustion chamber and a piston slidably positioned in the cylinder, multiple exhaust valves, wherein each exhaust valve is positioned in an exhaust port of each of the multiple cylinders, exhaust branch passages fluidly connecting the multiple exhaust valves to an exhaust pulse valve, an exhaust main passage fluidly connecting the exhaust pulse valve to a turbine inlet of the turbine section of the turbocharger, and a computer system. The computer system may include a non-transitory computer readable medium in communication with the multiple exhaust valves and the exhaust pulse valve, where the non-transitory computer readable medium stores instructions for actuating the exhaust pulse valve to a fully open position when at least one of the multiple exhaust valves is open, wherein when the exhaust pulse valve is in the fully open position, the exhaust branch passages are in fluid communication with the exhaust main passage and actuating the exhaust pulse valve to a fully closed position when the multiple exhaust valves are closed, wherein when the exhaust pulse valve is in the fully closed position, the exhaust branch passages are sealed from the exhaust main passage.

Any combinations of the various embodiments and implementations disclosed herein can be used in a further embodiment, consistent with the disclosure. Other aspects and advantages of the claimed subject matter will be apparent from the following description and the appended claims.

DETAILED DESCRIPTION

In one aspect, embodiments disclosed herein relate to improved internal combustion engines and methods for increasing efficiency in engine operation. Embodiments disclosed herein may include internal combustion engines and methods of their use in which cylinder deactivation (CDA) methods are combined with an exhaust pressure pulse management method (referred to herein as an exhaust pulse method for brevity) to both increase exhaust temperature and exhaust enthalpy of the engine.

Internal combustion engines described herein generally include multiple cylinders, where each cylinder contains a combustion chamber and a piston. Fuel and air are directed into and combust within the combustion chambers which moves the pistons, where movement of the pistons may rotate a connected crankshaft. Internal combustion engines may generally be operated according to a valve timing schedule, which, as described in more detail below, may include timing requirements for operation of fuel injection, intake valves, and exhaust valves to each combustion chamber. When applying CDA strategies to an internal combustion engine, CDA may include deactivating one or more cylinders in the engine, while the remaining cylinders may operate according to the same valve timing schedule that would be used if all cylinders were operating (full engine operation). Further, internal combustion engines described herein may include a turbocharger connected between an exhaust system of the engine and an air intake system of the engine.

Exhaust pulse strategies according to embodiments of the present disclosure may be applied to internal combustion engines through use of an exhaust pressure pulse management valve (referred to herein as an "exhaust pulse valve" for brevity) provided in the engine in a location capable of closing off exhaust flow from the cylinders to the remaining engine exhaust system. Further, exhaust pulse valves may be provided along an exhaust main passage fluidly connecting the exhaust ports of the engine cylinders to a turbocharger, where the turbocharger is connected between the exhaust system of the engine and an air intake system of the engine. In such position, opening and closing the exhaust pulse valve may provide pulsed exhaust pressure to the turbocharger, which in turn, may provide pulsed boost to air intake system of the engine. Exhaust pulse valves may be used during CDA engine operation and/or during full engine operation (while all cylinders in the engine are activated).

Figure 1:
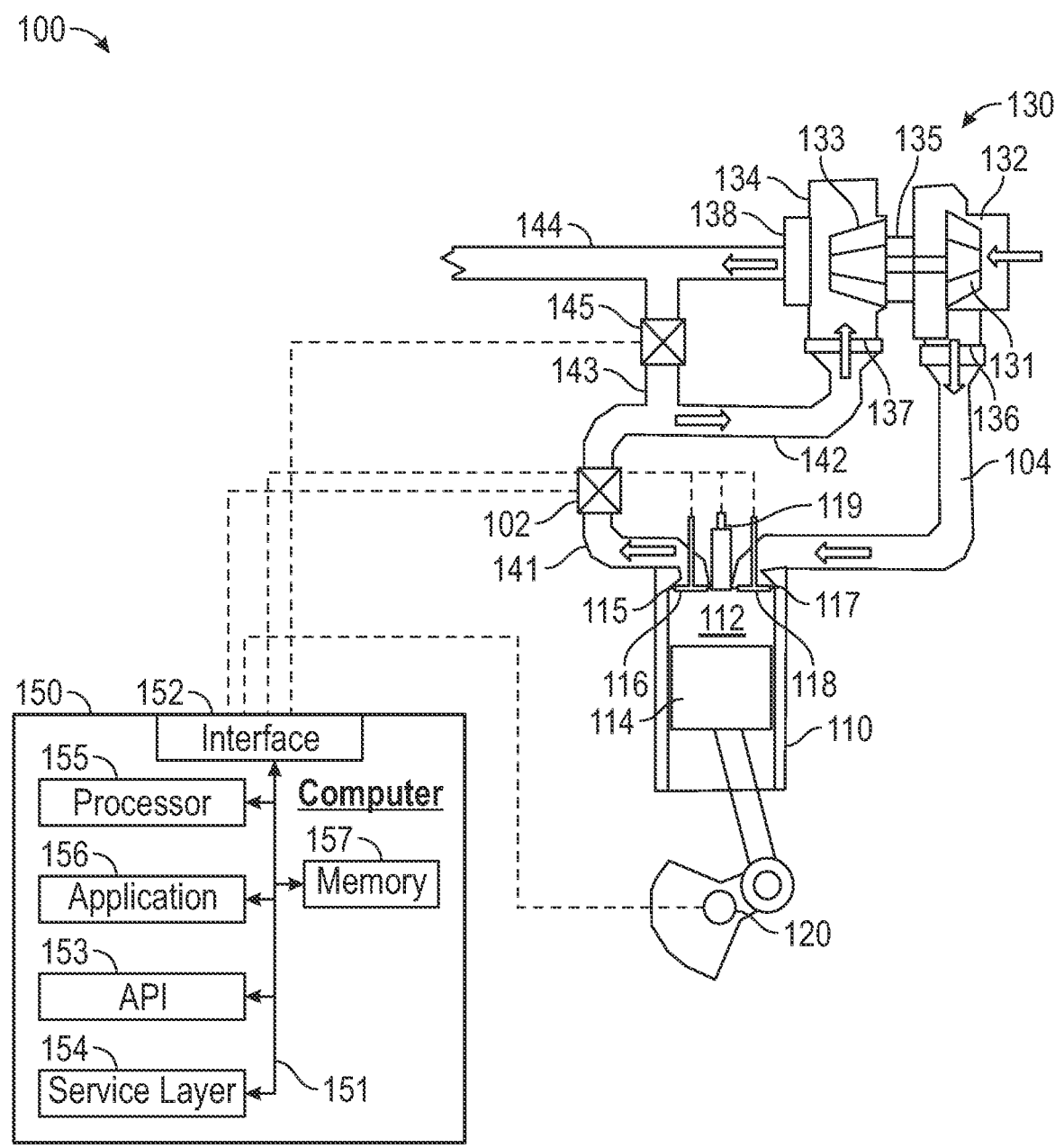
FIG. 1 shows a diagram of an engine according to embodiments of the present disclosure.

An example of an engine 100 having an exhaust pulse valve 102 according to embodiments of the present disclosure is shown in FIG. 1. In one or more embodiments, an exhaust pulse valve may be of the same type as an electronically controlled turbocharger wastegate valve (e.g., having a diameter of less than 50 mm). When used with engines operating at a speed of less than 1500 rpm, the valve may be selected as one being capable of being actuated with a desired response time range, e.g., 20-60 milliseconds, while withstanding stresses from hot exhaust gases.

The engine 100 includes a cylinder 110, which may be formed within an engine body or engine block. For ease of illustration, a single cylinder 110 is shown. However, the engine 100 may have multiple cylinders, for example, 2-16 cylinders, which may be arranged, for example, in an inline configuration, a v-configuration, or a flat-plane configuration. Each cylinder 110 includes a combustion chamber 112 and a piston 114 slidably positioned in the cylinder 110. The piston 114 is connected by a connecting rod to a crankshaft 120, which converts a reciprocating motion of the piston 114 into rotary motion of the crankshaft 120. The piston 114 is arranged to move back and forth within the cylinder 110, from a top dead center position (TDC) position (in which the piston is at the top of its stroke and the piston head is farthest away from the crankshaft 120) to a bottom dead center (BDC) position (in which the piston is at the bottom of its stroke and the piston head is closest to the crankshaft). The combustion chamber 112 is the enclosed space within the cylinder 110 defined between the piston head and upper end of the cylinder 110. Thus, as the piston 114 slides back and forth within the cylinder 110, the volume of the combustion chamber 112 changes. Components of the engine 100 may be formed of aluminum, iron, steel, or equivalent metals used in conventional engine design known to a person of ordinary skill in the art.

The engine 100 further includes multiple exhaust valves 116, wherein each exhaust valve 116 is positioned in an exhaust port 115 of each of the multiple cylinders 110. According to embodiments of the present disclosure, a cylinder may have a single exhaust port and associated exhaust valve, or a cylinder may have two exhaust ports each with an associated exhaust valve. The engine 100 also includes multiple intake valves 118, wherein each intake valve 118 is positioned in an intake port 117 of each of the multiple cylinders 110. According to embodiments of the present disclosure, a cylinder may have a single intake port and associated intake valve, or a cylinder may have two intake ports each with an associated intake valve. Exhaust valves 116 and intake valves 118 may each be actuated by a valve actuator known in the art. Additionally, a fuel injector 119 may be positioned adjacent to and interfacing with each cylinder 110, such that fuel may be injected from the fuel injector 119 into the combustion chamber 112 of each cylinder 110. The intake and exhaust valves 118, 116 and fuel injector 119 may be provided at the upper end of the cylinder 110.

The fuel injector 119, a fuel supply (not shown), and components such as valves and flowlines used to supply fuel from the fuel supply to the fuel injector 119 may form at least part of a fuel system of the engine.

Air may be flowed into the combustion chamber 112 through one or more intake valves 118 when the intake valve(s) are actuated to an open position, and air flow into the combustion chamber 112 may be stopped by actuating the intake valve(s) to a closed position. Similarly, exhaust gases may be flowed out of the combustion chamber 112 through one or more exhaust valves 116 when the exhaust valve(s) are actuated to an open position, and exhaust flow out of the combustion chamber 112 may be stopped by actuating the exhaust valve(s) to a closed position. The intake valve(s) and exhaust valve(s) to each cylinder 110 in the engine 100 may be actuated to open and closed positions according to an engine valve timing schedule.

The intake ports 117 are fluidly connected to an intake system of the engine 100. The intake system may include an assembly of flowlines, valves, and/or other components that can receive air from the ambient environment around the engine and direct the air flow through at least one intake line 104 to the intake port(s) 117 of the engine 100. For example, in addition to the at least one intake line 104 and the intake valves 118, an intake system may include at least one of an intake manifold, a charge air cooler, an intake flowline valve, a throttle, and other components that regulate and/or change the physical properties of the intake air. In one or more embodiments, intake line(s) 104 may be fluidly connected to intake ports 117 of multiple cylinders 110 via an intake manifold. An intake manifold may include multiple intake branches that extend from the multiple intake ports and merge to connect to the intake line 104.

The exhaust ports 115 are fluidly connected to an exhaust system of the engine 100. The exhaust system of the engine may include an assembly of flowlines, valves, and other components that can direct exhaust flow out of the engine 100. For example, the exhaust system in FIG. 1 includes the exhaust valves 115, an exhaust main passage 142, an exhaust pulse valve 102 positioned along the exhaust main passage 142, and exhaust branch passages 141 fluidly connecting each of the exhaust ports 115 to the exhaust pulse valve 102. In one or more embodiments, the exhaust branch passages 141 may be formed in an exhaust manifold fluidly connecting the exhaust ports 115 of the multiple cylinders to the exhaust pulse valve 102. The exhaust system in FIG. 1 also includes a bypass line 143 fluidly connecting the exhaust main passage 142 to an exhaust outlet line 144. The bypass line 143 fluidly connects to the exhaust main passage 142 downstream of the exhaust pulse valve 102. Additionally, a bypass valve 145 is positioned along the bypass line 143 such that the bypass valve 145 is capable of preventing exhaust flow through the bypass line 143 when closed and allowing exhaust flow through the bypass line 143 when open. According to embodiments of the present disclosure, an exhaust system may also include at least one of an Exhaust Gas Regulation (EGR) system, a filter, a selective catalytic reduction component, additional exhaust connection lines, exhaust control valves, and other components that regulate and/or change the physical properties of the exhaust flowing through the exhaust system.

A turbocharger 130 is connected between the exhaust system of the engine 100 and the intake system of the engine 100. The turbocharger 130 has a compressor 131 housed in a compressor section 132 of the turbocharger 130, a turbine 133 housed in a turbine section 134 of the turbocharger 130, and a shaft 135 connecting the compressor 131 to the turbine 133. In one or more embodiments, the compressor 131 and the turbine 133 may each have a body with multiple blades extending radially outward from its axis of rotation, as known in the art. The compressor section 132 of the turbocharger is connected to the intake system, and the turbine section 134 of the turbocharger is connected to the exhaust system. For example, as shown in FIG. 1, at least one intake line 104 may fluidly connect a compressor outlet 136 of the compressor section 132 to the intake ports 117 of the engine cylinders 110. The compressor inlet to the compressor section 132 may be fluidly connected to an intake inlet line (not shown), which may direct air into the compressor section 132 of the turbocharger. The exhaust system of the engine is connected to the turbine section 134 of the turbocharger via a turbine inlet 137 and a turbine outlet 138. The exhaust main passage 142 fluidly connects the exhaust pulse valve 102 to the turbine inlet 137, and the turbine outlet 138 is fluidly connected to the exhaust outlet line 144. The bypass line 143 is connected between the exhaust main passage 142 and the exhaust outlet line 144, such that exhaust flow may be directed through the bypass line 143 to bypass the turbine section 134 of the turbocharger 130.

In one or more embodiments, a computer system 150 may be in wired and/or wireless communication with components of the engine 100, such as valves and sensors, to receive data about the engine components and/or to send commands to operate the engine components. For example, as described in more detail below, the computer system 150 may include a non-transitory computer readable medium in communication with the exhaust valves 116, the exhaust pulse valve 102, the intake valves 118, and the fuel injector 119. The computer system 150 may be used to provide computational functionalities associated with described algorithms, methods, functions, processes, flows, and procedures as described herein to operate the engine 100.

At a high level, the computer system 150 may include an electronic computing device operable to receive, transmit, process, store, or manage data and information associated with the described subject matter. According to some implementations, the computing device may also include or be communicably coupled with an application server, caching server, streaming data server, business intelligence (BI) server, or other server (or a combination of servers). In one or more embodiments, the computing device may include at least one processor. Generally, the processor executes instructions and manipulates data to perform the operations of the computing device and any algorithms, methods, functions, processes, flows, and procedures as described herein. In one or more embodiments, the computing device may include a memory that holds data for the computing device. For example, the memory can be a database storing data consistent with this disclosure. In one or more embodiments, the computing device may include an application, which is an algorithmic software engine providing functionality according to particular needs, desires, or particular implementations of the computing device, particularly with respect to functionality described in the present disclosure.

The illustrated computer system 150 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system 150 may include a computer that includes an input device, such as a keypad, keyboard, touch screen, or other device that can accept user information, and an output device that conveys information associated with the operation of the computer system 150, including digital data, visual, or audio information (or a combination of information), or a GUI.

The computer system 150 can receive requests over a network from a client application (for example, executing on another computer) and responding to the received requests by processing the said requests in an appropriate software application. In addition, requests may also be sent to the computer system 150 from internal users (for example, from a command console or by other appropriate access method), external or third-parties, other automated applications, as well as any other appropriate entities, individuals, systems, or computers.

Each of the components of the computer system 150 can communicate using a system bus 151. In some implementations, any or all of the components of the computer system 150, both hardware or software (or a combination of hardware and software), may interface with each other or the interface 152 (or a combination of both) over the system bus 151 using an application programming interface (API) 153 or a service layer 154 (or a combination of the API 153 and service layer 154). The API 153 may include specifications for routines, data structures, and object classes. The API 153 may be either computer-language independent or dependent and refer to a complete interface, a single function, or even a set of APIs. The service layer 154 provides software services to the computer system 150 or other components (whether or not illustrated) that are communicably coupled to the computer system 150.

The functionality of the computer system 150 may be accessible for all service consumers using this service layer. Software services, such as those provided by the service layer 154, provide reusable, defined functionalities through a defined interface. For example, the interface may be software written in JAVA, C++, or other suitable language providing data in extensible markup language (XML) format or other suitable format. While illustrated as an integrated component of the computer system 150, alternative implementations may include the API 153 or the service layer 154 as stand-alone components in relation to other components of the computer system 150 or other components (whether or not illustrated) that are communicably coupled to the computer system 150. Moreover, any or all parts of the API 153 or the service layer 154 may be implemented as child or sub-modules of another software module, enterprise application, or hardware module without departing from the scope of this disclosure.

The computer system 150 includes one or more interfaces 152 according to particular needs, desires, or particular implementations of the computer system 150. An interface 152 may be used by the computer system 150 for communicating with other systems in a distributed environment. For example, the interface 152 may include logic encoded in software or hardware (or a combination of software and hardware) and may be operable to communicate with a network, e.g., via software supporting one or more communication protocols associated with communications such that the network or interface's hardware is operable to communicate physical signals within and outside of the illustrated computer system 150.

The computer system 150 includes one or more computer processors 155. Generally, the computer processor 155 executes instructions and manipulates data to perform the operations of the computer system 150 and any algorithms, methods, functions, processes, flows, and procedures as described herein. The computer system 150 also includes a non-transitory computer readable medium, or a memory 157, that holds data for the computer system 150. For example, memory 157 can be a database storing data consistent with this disclosure. Examples of computer readable medium include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable medium is stored and executed in a distributed fashion, e.g., by a telematics server or a controller area network (CAN). Although illustrated as a single memory 157 in FIG. 1, two or more memories may be used according to particular needs, desires, or particular implementations of the computer system 150 and the described functionality. The computer system 150 also includes one or more applications 156, where an application 156 is an algorithmic software engine providing functionality for executing instructions stored in the memory 157. The application 156 can serve as one or more components, modules, applications, etc. While memory 157 and application 156 are illustrated as integral components of the computer system 150, in alternative implementations, memory 157 and/or application 156 can be external to the computer system 150.

In one or more embodiments, non-transitory computer readable medium in the computer system 150 may store instructions for actuating the exhaust pulse valve 102 (e.g., via communication to the valve actuator) to a fully open position when at least one of the exhaust valves 116 is open, wherein when the exhaust pulse valve 102 is in the fully open position, the exhaust branch passages 141 are in fluid communication with the exhaust main passage 142. The non-transitory computer readable medium may also store instructions for actuating the exhaust pulse valve 102 to a fully closed position when the exhaust valves 116 are closed, wherein when the exhaust pulse valve 102 is in the fully closed position, the exhaust branch passages 141 are sealed from the exhaust main passage 142. The non-transitory computer readable medium may also store instructions for keeping at least one of the multiple cylinders in the engine 100 deactivated while the engine is running. Engine operating instructions and methods capable of being executed by the computer system 150 are described in more detail below.

According to embodiments of the present disclosure, methods of operating an engine may include using an exhaust pulse method to selectively open and close an exhaust pulse valve in the engine, where opening the exhaust pulse valve allows exhaust flow from the engine cylinders to a turbocharger connected between the exhaust and intake systems of the engine, and where closing the exhaust pulse valve prevents exhaust flow from the engine cylinders to the turbocharger and remaining portions of the exhaust system. The exhaust pulse valve may be selectively opened and closed (e.g., using computer system 150) based on, for example, a valve timing schedule of the engine, the positions of the cylinder exhaust valves, and/or the rotational position of the crankshaft during an engine cycle. By selectively allowing exhaust flow through the exhaust pulse valve to the turbocharger, a pulsed pressure boost may be provided by the turbocharger, which may increase the volume of intake air through the intake system of the engine.

Additionally, in one or more embodiments, the exhaust pulse valve may be selectively opened and closed while a CDA method is implemented, where at least one engine cylinder is deactivated (deactivated cylinder) and at least one engine cylinder is operational (active cylinder). By using a combination of an exhaust pulse method with a CDA method according to embodiments of the present disclosure, both the exhaust temperature and exhaust enthalpy from the engine may be increased. Examples of methods using a combination exhaust pulse and CDA according to embodiments of the present disclosure are described below referencing FIG. 2.

Figure 2:
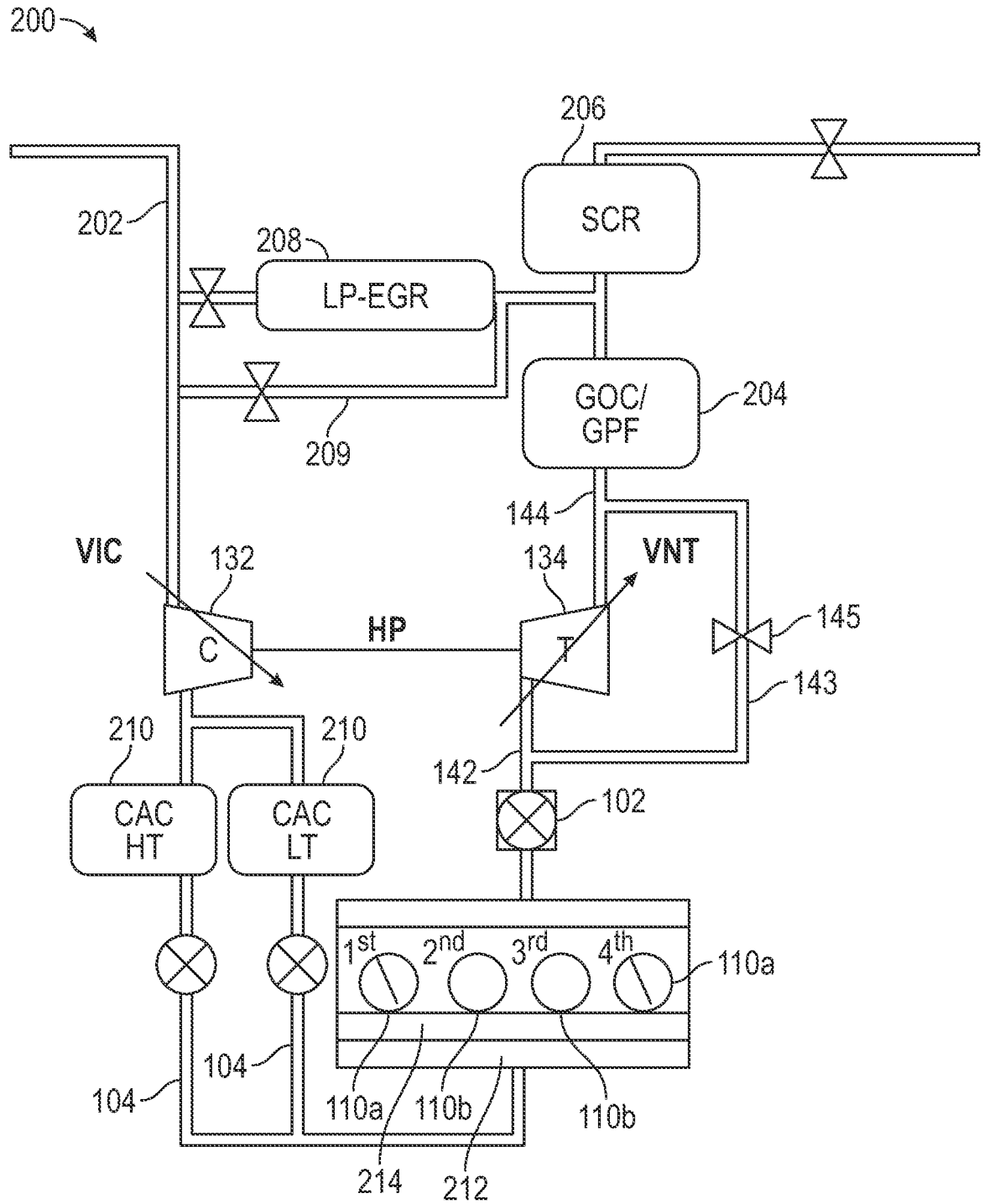
FIG. 2 shows a diagram of an engine according to embodiments of the present disclosure.

FIG. 2 shows diagram of an engine 200 having an exhaust pulse valve 102 according to embodiments of the present disclosure. The exhaust pulse valve 102 is positioned along an exhaust main passage 142 fluidly connecting exhaust ports of the cylinders 110a, 110b (collectively referred to as 110) to a turbine section 134 of a turbocharger. The exhaust pulse valve 102 is in a location along the exhaust main passage 142 that allows closure of the exhaust pulse valve to prevent exhaust flow from the cylinders 110 of the engine 200 to the remaining downstream portions of the exhaust system. When the exhaust pulse valve 102 is in a fully open configuration, exhaust flow from the cylinders 110 may be directed to the turbine section 134 of the turbocharger. Exhaust flow may be directed from a turbine outlet of the turbine section 134 to an exhaust outlet line 144. Additionally, a bypass line 143 is connected to the exhaust main passage 142 downstream of the exhaust pulse valve 102, where the bypass line 143 may be used to bypass exhaust flow around the turbocharger to the exhaust outlet line 144. Along the exhaust outlet line 144, the exhaust flow may be processed, recirculated to the intake system of the engine, and/or ejected from the engine 200. For example, a gasoline particulate filter 204, a selective catalytic reduction unit 206 and/or other exhaust filter may be provided along the exhaust outlet line 144 downstream of the turbine section 134 of the turbocharger, which may be used to filter and process the exhaust. Additionally, exhaust may be redirected to an intake inlet line 202 of the engine intake system via an exhaust gas recirculation (EGR) system, e.g., a low pressure EGR system 208, and/or a recirculation line 209.

The intake system of the engine 200 may include the intake inlet line 202, which may be fluidly connected to a compressor section 132 of the turbocharger. When the compressor in the compressor section 132 is moved by the connected turbine in the turbine section 134 of the turbocharger, air flowing from the intake inlet line 202 may be compressed in the compressor section 132 of the turbocharger and ejected at an increased flow rate from the compressor section 132, through one or more fluidly connected intake lines 104, to the intake ports of the engine cylinders 110. In one or more embodiments, intake air flow may be directed through a high temperature intake line or a low temperature intake line 104 to the engine cylinders 110. Additionally, an intake system may include one or more charge air coolers 210 positioned along the intake line(s) 104. The charge air coolers 210 may cool the intake air flow after it has passed through the turbocharger but prior to entering one or more engine cylinders 110. The intake line(s) 104 may be fluidly connected to intake ports of the cylinders 110 via intake branches. The intake branches may be provided in an intake manifold 214. In one or more embodiments, the intake system may also include an intake air heater 212 positioned proximate the intake manifold 214, where the intake air heater 212 may be used for cold starts to pre-heat the intake air flow prior to entering one or more cylinders 110.

In one or more embodiments, methods of operating the engine 200 may include deactivating at least one cylinder (deactivated cylinder) and operating at least one cylinder (activated cylinder) according to a CDA valve timing schedule. In the embodiments shown in FIG. 2, two cylinders are deactivated cylinders 110a and two cylinders are activated cylinders 110b. However, depending on the engine and other operating conditions, one or more than two cylinders may be deactivated for CDA. During engine cold-start (e.g., at 20° C. ambient), CDA shows potential to increase the exhaust gas temperature by increasing the engine-load in the active cylinders.

The deactivated cylinders 110a may be deactivated by stopping intake and exhaust valve operation to each deactivated cylinder 110a to keep the intake and exhaust valves closed and by stopping fueling to each deactivated cylinder 110a. In one or more embodiments, such deactivation procedure may be performed using a computer system, where commands to close the selected intake and exhaust valves and to stop fueling may be sent from the computer system. The activated cylinders 110b may be operated while the deactivated cylinders 110a are deactivated by opening and closing the intake and exhaust valves for each activated cylinder 110b and fueling each activated cylinder 110b according the CDA valve timing schedule. The CDA valve timing schedule may include, for example, a valve timing diagram indicating timing for opening and closing the intake and exhaust valves and start/stop of the fuel injection based on the movement of the piston from TDC to BDC in all the piston strokes of the engine cycle.

While the engine 200 is operating under the CDA valve timing schedule, the exhaust pulse valve 102 may be actuated according to an exhaust pulse timing schedule. The exhaust pulse timing schedule may include actuating the exhaust pulse valve 102 to a fully open position while at least one of the exhaust valves to the activated cylinders 110b is open and actuating the exhaust pulse valve 102 to a fully closed position while all the exhaust valves to the activated cylinders 110b are closed. Similarly, in embodiments having a different number of activated cylinders than shown in FIG. 2, the exhaust pulse valve 102 may be actuated to a fully opened position while at least one exhaust valve to one or more activated cylinder is open and to a fully closed position while each exhaust valve to the one or more activated cylinder is closed. In one or more embodiments, the exhaust valves to the activated cylinders 110b may be opened and closed in a slightly overlapping and sequential order, where the exhaust pulse valve 102 may remain open as long as at least one exhaust valve is open. A computer system may be used to deactivate the at least one deactivated cylinder, operate the at least one activated cylinder, and actuate the exhaust pulse valve, wherein the computer system is in communication with the intake valves, the exhaust valves, and the exhaust pulse valve.

Exhaust flow from open exhaust valves of the activated cylinders 110b may be directed through an opened exhaust pulse valve 102 to the turbine section 134 of the turbocharger and/or to a bypass line 143 to bypass the turbocharger. In one or more embodiments, a computer system may be used to direct exhaust flow from the activated cylinders 110b through the exhaust pulse valve 102 to the bypass line 143 when the exhaust pulse valve 102 is fully opened. The bypass valve 145 may be selectively opened to allow exhaust flow to bypass the turbocharger through the bypass line 143 or closed to prevent bypass exhaust flow. When exhaust flow is directed through an opened exhaust pulse valve 102 to the turbine section 134 of the turbocharger, the exhaust flow may rotate the turbine in the turbine section 134, which thereby rotates the connected compressor in the compressor section 132 of the turbocharger.

While the engine 200 is operating, intake air flow through the compressor section 132 of the turbocharger may be directed through at least one intake line 104 to the intake valves of the activated cylinders 110b. Thus, when exhaust flow is directed through the turbine section 134 of the turbocharger to rotate the compressor in the compressor section 132 of the turbocharger, the flow rate of the air from the compressor section 132 may be increased ("boosted"). By using the exhaust pulse valve 102 to boost air flow from the compressor section 132 of the turbocharger in a pulsed manner, according to the exhaust pulse timing schedule, an increased air to fuel ratio may be provided to the activated cylinders 110b. For example, in one or more embodiments, an air to fuel ratio may be provided to at least one activated cylinder ranging from 15.7 to 19.

The engine 200 may be operated using a computer system, which may include a predetermined program implemented with at least one processor, where the predetermined program may be programmed in order to perform each step of the method for controlling the valve timing and fueling in the engine. Various methods described herein may be implemented with a computer readable medium that may be read by the computer system using software, hardware, or a combination thereof. For example, the hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions. The software including instructions for performing methods according to embodiments of the present disclosure may be implemented by separate software modules. Each of the software modules may perform one or more functions and operations described in the present disclosure. A software code may be implemented by a software application written in an appropriate program language.

In operation, the computer system may receive signals from various sensors such as a mass air flow sensor, a manifold pressure sensor, a catalyst temperature sensor, a temperature sensor, and a crankshaft position sensor, for example. Additionally, an engine speed signal (RPM) may be generated by a computer system from an ignition profile signal generated by crankshaft position sensor in response to rotation of the crankshaft. The computer system may be used to implement CDA and/or exhaust pulse methods disclosed herein based on the received signals related to the engine operation.

According to embodiments of the present disclosure, an exhaust pulse timing schedule may be based on a valve timing diagram indicating timing for opening and closing the intake and exhaust valves and start/stop of the fuel injection based on the movement of the pistons from TDC to BDC in all the strokes of the engine cycle. Because the rotational position of the crankshaft during an engine cycle may be correlated with the position of the pistons in the engine's cylinders, and thus also the opening and closing of the exhaust valves to the engine's cylinders, an exhaust pulse timing schedule according to some embodiments of the present disclosure may include opening and closing an exhaust pulse valve based on the rotational position of the engine's crankshaft.

For example, referring again to FIG. 2, an exhaust pulse method may include operating one or more activated cylinders 110b in an engine 200 to rotate the engine's crankshaft (e.g., 120 in FIG. 1). While the crankshaft is rotating during a first portion of an engine cycle, the exhaust pulse valve 102 is actuated to stay in a fully open position to allow exhaust flow from the activated cylinders 110b to the turbocharger. In one or more embodiments, the first portion of the engine cycle may correspond with the time during the engine cycle in which exhaust valves to the engine's cylinders 110 are open. For example, in some embodiments, during the first portion of the engine cycle, the exhaust valves of at least two cylinders may be opened and closed in a sequential order, where a subsequent exhaust valve opening occurs immediately prior to the previous exhaust valve closing. In such manner, at least one exhaust valve may be open during the first portion of the engine cycle. While the crankshaft is rotating during a remaining portion of the engine cycle, the exhaust pulse valve 102 is actuated to stay in a fully closed position to block exhaust flow from the activated cylinders. During the remaining portion of the engine cycle, all the exhaust valves in the engine may be in a closed position. In one or more embodiments, at least two of the cylinders in the engine may be deactivated during the first portion and the remaining portion of the engine cycle.

Figure 3:
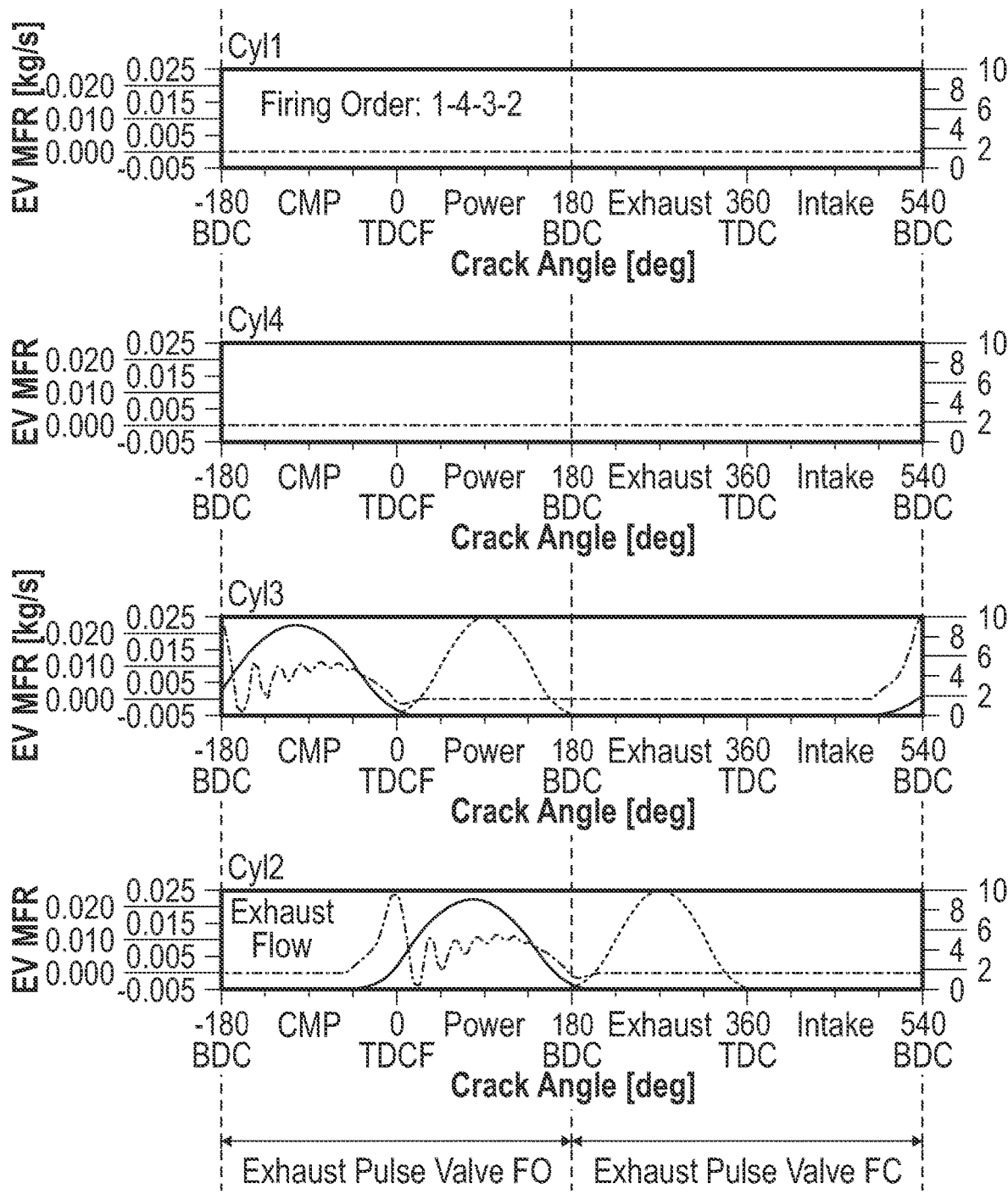
FIG. 3 shows a graphical representation of an engine cycle when operating the engine 200 shown in FIG. 2 according to one or more embodiments of the present disclosure.

FIG. 3 shows a graphical representation of an engine cycle when operating the engine 200 shown in FIG. 2 according to one or more embodiments of the present disclosure. Particularly, FIG. 3 shows an example of the intake and exhaust valve profiles and the associated exhaust valve flow events for all the cylinders 110 of the engine 200 during a single engine cycle in which the crankshaft rotates from −180 deg. to 540 deg. in the engine cycle, and in which the cylinders 110 fire in an order: Pt cylinder, 4th cylinder, $3^{rd}$ cylinder, $2^{nd}$ cylinder. As shown in FIG. 2, the $1^{st}$ and $4^{th}$ cylinders are deactivated cylinders 110a (non-firing), and the $3^{rd}$ and $2^{nd}$ cylinders are activated cylinders 110b. Thus, the exhaust valve flow profiles of the activated cylinders 110b occur back-to-back, in a slightly overlapping and sequential order.

To capture the pulse dynamics of the exhaust flow from the activated cylinders 110b in a sequence, and raise the expansion ratio across the turbine, the exhaust pulse valve 102 was maintained in fully open (FO) position during the exhaust valve duration of the activated cylinders 110b. Because the activated cylinders 110b have back-to-back exhaust valve flow profiles, the exhaust pulse valve 102 is in the fully open position continuously while the engine crankshaft is rotated through a first portion of the engine cycle. For the rest of the engine cycle, the exhaust pulse valve 102 was maintained in fully closed (FC) position, preventing exhaust flow to the turbocharger.

In the embodiment shown in FIG. 3, the first portion of the engine cycle in which the exhaust pulse valve 102 is fully open ranges from a crankshaft rotational position of −180 deg. to 180 deg., while the remaining portion of the engine cycle in which the exhaust pulse valve 102 is fully closed ranges from the crankshaft rotational position of 180 deg. to 540 deg. However, in engines having different exhaust valve flow profiles, the crankshaft rotational position during a first portion of an engine cycle, in which the exhaust pulse valve is in a fully open position, and during a remaining portion of the engine cycle, in which the exhaust pulse valve is in a fully closed position may vary.

Additionally, FIG. 3 shows an example operating sequence of an example engine 200 having an exhaust pulse valve 102 according to embodiments of the present disclosure. However, one of ordinary skill in the art will appreciate that exhaust pulse methods disclosed herein may be applied to other engines having more or less than four cylinders and/or having different engine cycle parameters.

Comparison Examples

By using engines and methods according to embodiments of the present disclosure, in which an exhaust pulse valve may be used during CDA and exhaust pulse methods, both exhaust temperature and exhaust enthalpy may be increased when compared to using engines without an exhaust pulse valve. For example, comparison examples are described below to compare performance of 1) a comparison engine without an exhaust pulse valve operating with and without CDA; 2) the comparison engine using intake air heating and back-pressure valve actuation; and 3) the engine 200 of FIG. 2 with an exhaust pulse valve 102 according to embodiments of the present disclosure operating under a combination of CDA and exhaust pulse method.

Figure 4:
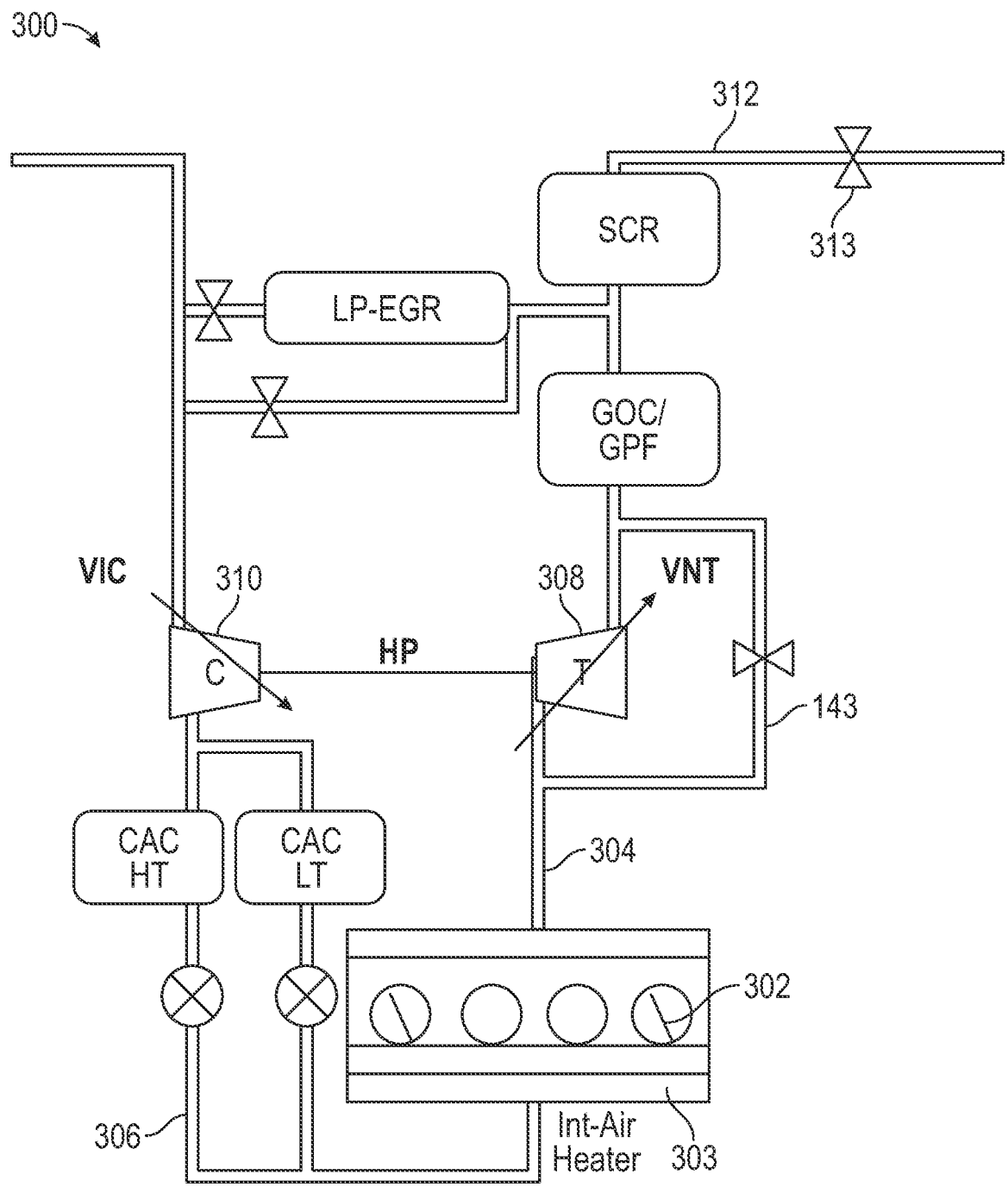
FIG. 4 shows a diagram of an engine without an exhaust pulse valve used for comparison with methods for operating the engine shown in FIG. 2.

Referring first to FIG. 4, a schematic of the comparison engine 300 without an exhaust pulse valve is shown. As shown in FIG. 4, the comparison engine 300 includes an engine block having four cylinders 302, an assembly of exhaust lines 304 fluidly connecting the exhaust ports of the engine cylinders 302 to components of the engine's exhaust system, an assembly of intake lines 306 fluidly connecting components of the engine's intake system to the intake ports of the engine cylinders 302, and a turbocharger connected between the intake system and the exhaust system, where the turbine section 308 of the turbocharger is fluidly connected to the exhaust lines 304 and the compressor section 310 of the turbocharger is fluidly connected to the intake lines 306. Intake air flow in the engine 300 may flow through the compressor section 310 of the turbocharger and through intake lines 306 to eventually enter the cylinders 302 for use in internal combustion within the cylinders 302. An intake air heater 303 may be positioned proximate an intake manifold to the cylinders to heat intake air flow prior to entering the cylinders 302. Exhaust from the combustion process may exit the cylinders 302 and be directed through exhaust lines 304 to flow through the turbine section 308 of the turbocharger and/or through a bypass line 305 to bypass the turbocharger. Exhaust flow may eventually exit the engine system (e.g., via exhaust outlet line 312) or be recirculated to the intake system. A backpressure valve 313 may be provided along the exhaust outlet line 312, downstream of the turbocharger, where backpressure generated by operation of the backpressure valve 313 may be redirected to the intake system to provide increase air flow through the intake system to the cylinders 302. Additionally, when exhaust flows through the turbine section 308 of the turbocharger, such flow may power the compressor in the compressor section 310 to boost intake air flow.

Figure 5A:
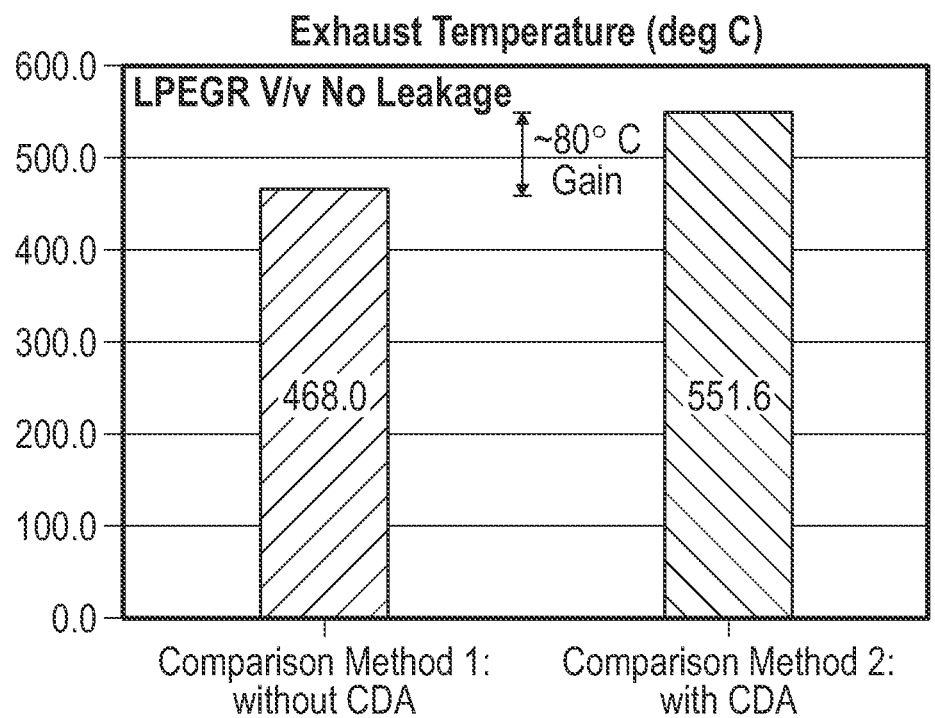
FIGS. 5A and 5B show graphs comparing the exhaust temperature and exhaust enthalpy, respectively, when operating the engine in FIG. 4 without CDA and with CDA.
Figure 5B:
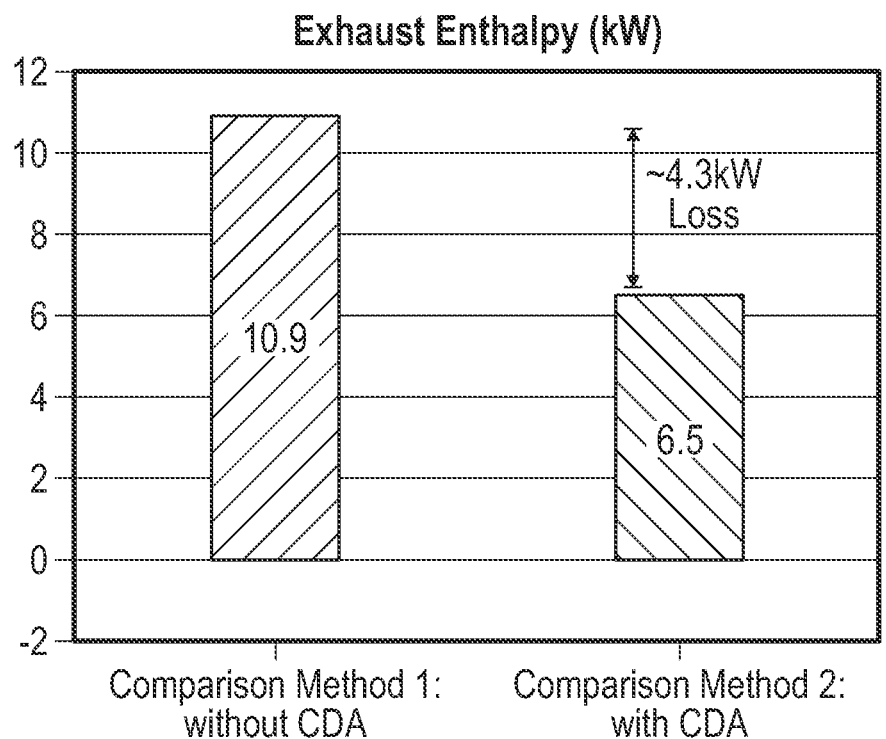

FIGS. 5A and 5B show graphs of the exhaust temperature and exhaust enthalpy, respectively, of the comparison engine 300 operating without CDA (Comparison Method 1) and with CDA (Comparison Method 2) for the first performance comparison. In the Comparison Method 1, all four cylinders 302 of the comparison engine 300 were activated to operate the comparison engine 300 without CDA. In the Comparison Method 2, the comparison engine 300 was operated under CDA by deactivating the $1^{st}$ and $4^{th}$ cylinders 110 and leaving the $2^{nd}$ and $3^{rd}$ cylinders 110 as the activated cylinders. Following the underlying principle for CDA, the fueling in the activated cylinders was raised to 26 mg/cylinder when operating under CDA in Comparison Method 2, compared to 20 mg/cylinder when operating without CDA in Comparison Method 1. No further fueling was attempted after reaching the threshold near-stoichiometric air-fuel ratio threshold limit of 15.7.

As shown in FIG. 5A, when operating the comparison engine 300 using Comparison Method 2, with CDA, there was a significant increase (-80° C.) in exhaust temperature when compared to operating the comparison engine 300 using Comparison Method 1, without CDA. On the other hand, as shown in FIG. 5B, operating the comparison engine 300 using Comparison Method 2 (with CDA) caused an approximate 40% drop in exhaust enthalpy, primarily due to about 50% loss of total flow caused by the deactivated cylinders. Thus, due to the flow loss caused by CDA, CDA's potential for cold-start was compromised. For an improved cold-start warmup, both the exhaust temperature and the enthalpy are required to be raised simultaneously. Thus, to improve the effectiveness of CDA during cold-start warmup, recovery of lost flow is important.

For comparison performance, the comparison engine 300 was operated using existing engine strategies for engine cold start assist that included using the intake air heater 303 and the backpressure valve 313, referred to as Comparison Methods 3-5, to increase the total intake air flow.

In Comparison Method 3, the comparison engine 300 was operated using the CDA strategy from Comparison Method 2 while also operating the intake air heater 303 and backpressure valve 313 at a baseline level, where the intake air heater 303 was powered at a 2.5 kW and the backpressure valve 313 was 2% opened. The intake manifold pressure (IMP) measured in the engine 300 using Comparison Method 3 was 1.09 bar. In Comparison Method 4, after operating the comparison engine 300 using Comparison Method 3, the intake air heater 303 power was reduced from the baseline 2.5 kW to about 1 kW. The reduction in the intake air heater power helped increase trapped air flow, resulting in an improved volumetric efficiency. The intake manifold pressure (IMP) measured in the engine 300 using Comparison Method 4 was 1.1 bar. In Comparison Method 5, after operating the comparison engine 300 using Comparison Method 4, the backpressure valve 313 was opened to a 5% open position (increased from the baseline 2% open in Comparison Methods 3 and 4). Thus, Comparison Method 5 included operating the engine 300 using CDA, with the intake air heater powered at 1 kW, and with the backpressure valve 313 at a 5% open position. Increasing the opening through the backpressure valve 313 (throttling the backpressure valve from 2% open to 5% open) increased the intake air flow, thereby increasing the expansion ratio across the turbine and generating a slightly higher boost pressure. The intake manifold pressure (IMP) measured in the engine 300 using Comparison Method 5 was 1.15 bar.

Figure 6A:
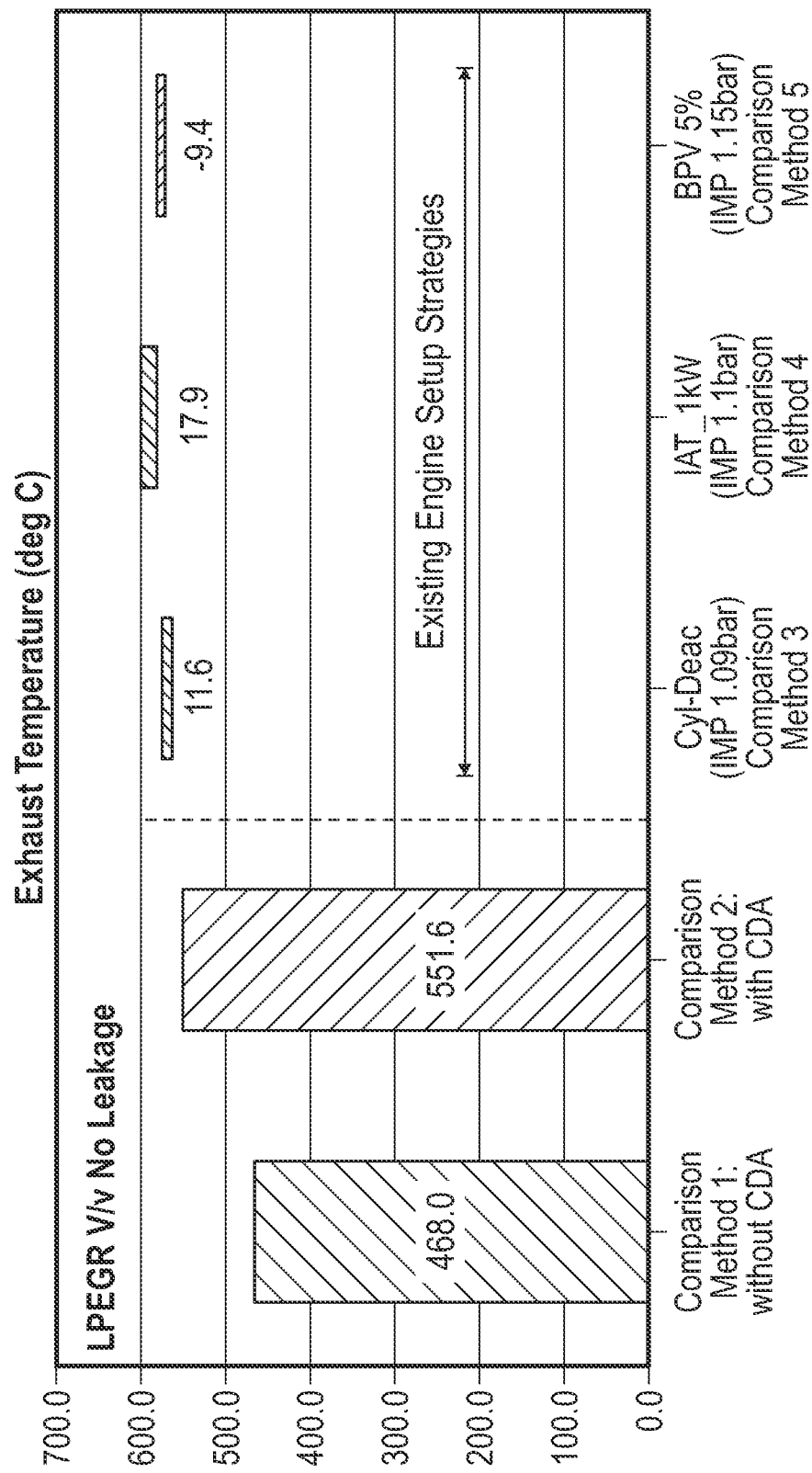
FIGS. 6A and 6B show graphs comparing the exhaust temperature and exhaust enthalpy, respectively, when operating the engine in FIG. 4 under different comparison methods.
Figure 6B:
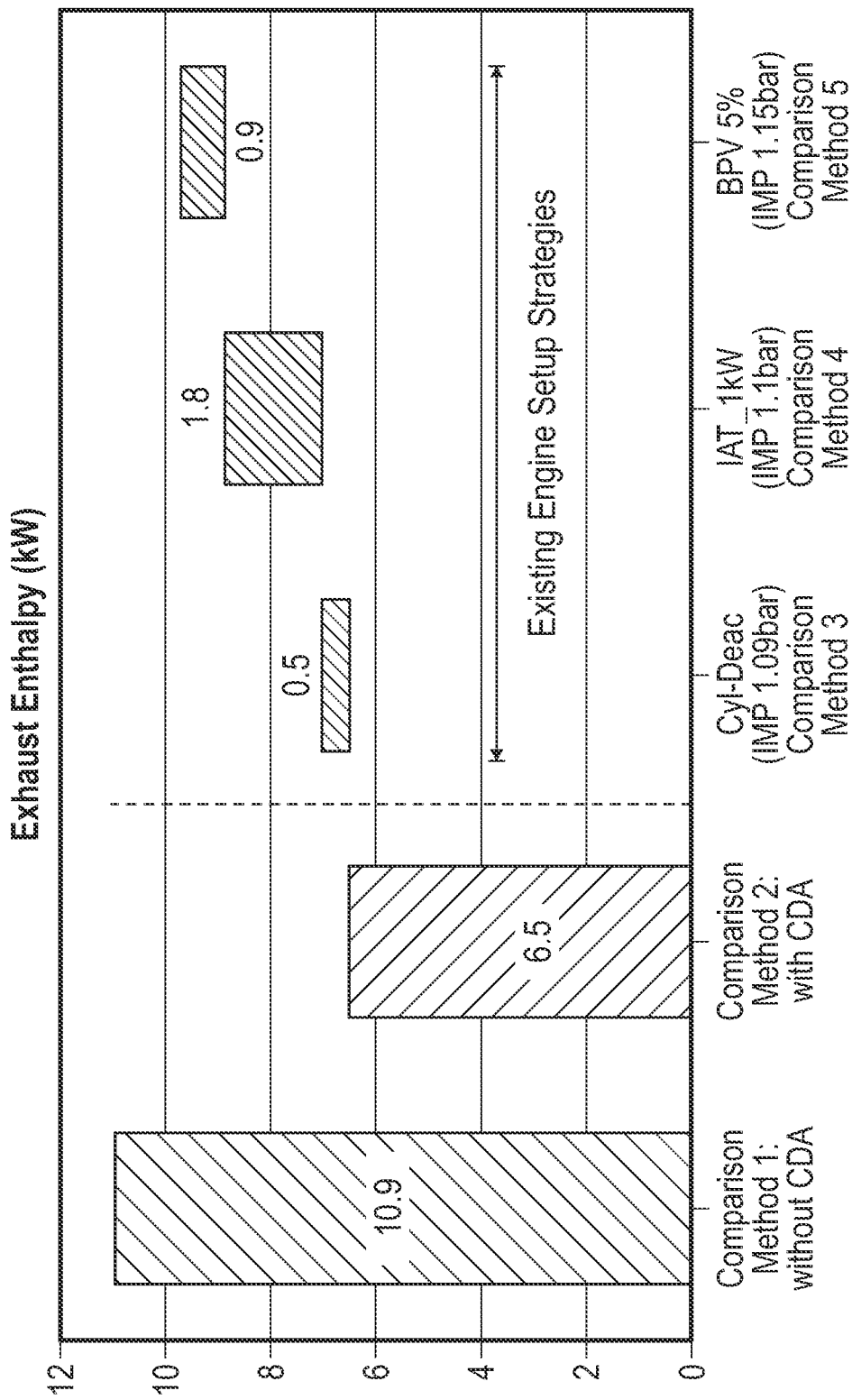

FIGS. 6A and 6B show the impact on the exhaust temperature and exhaust enthalpy, respectively, when operating the comparison engine 300 using Comparison Methods 1-5.

Using the combination of CDA with the intake air heater 303 and backpressure valve 313 methodologies of Comparison Methods 3-5, the intake air pressure into the engine 300 was raised by about 15 kPa, which allowed fueling to the cylinders of about 35 mg/cyl, and thus an increase of about 40% in the exhaust flow rate of the engine 300. As shown in FIG. 6A, when using the combinations of CDA with intake air heater and backpressure valve operation of Comparison Methods 3-5, the exhaust temperature increased marginally over the CDA baseline of 551.6 deg. C. The low increase in exhaust temperature from Comparison Methods 3-5 resulted from the air-fuel ratio reaching 15.7 due to the increased fueling from CDA. As shown in FIG. 6B, the increased exhaust flow resulting from Comparison Methods 3-5 raised the exhaust enthalpy to 9.7 kW from exhaust enthalpy of 6.5 kW resulting from Comparison Method 2. The exhaust enthalpy could not be further increased due to reaching the threshold air-fuel ratio limit of 15.7.

Figure 7A:
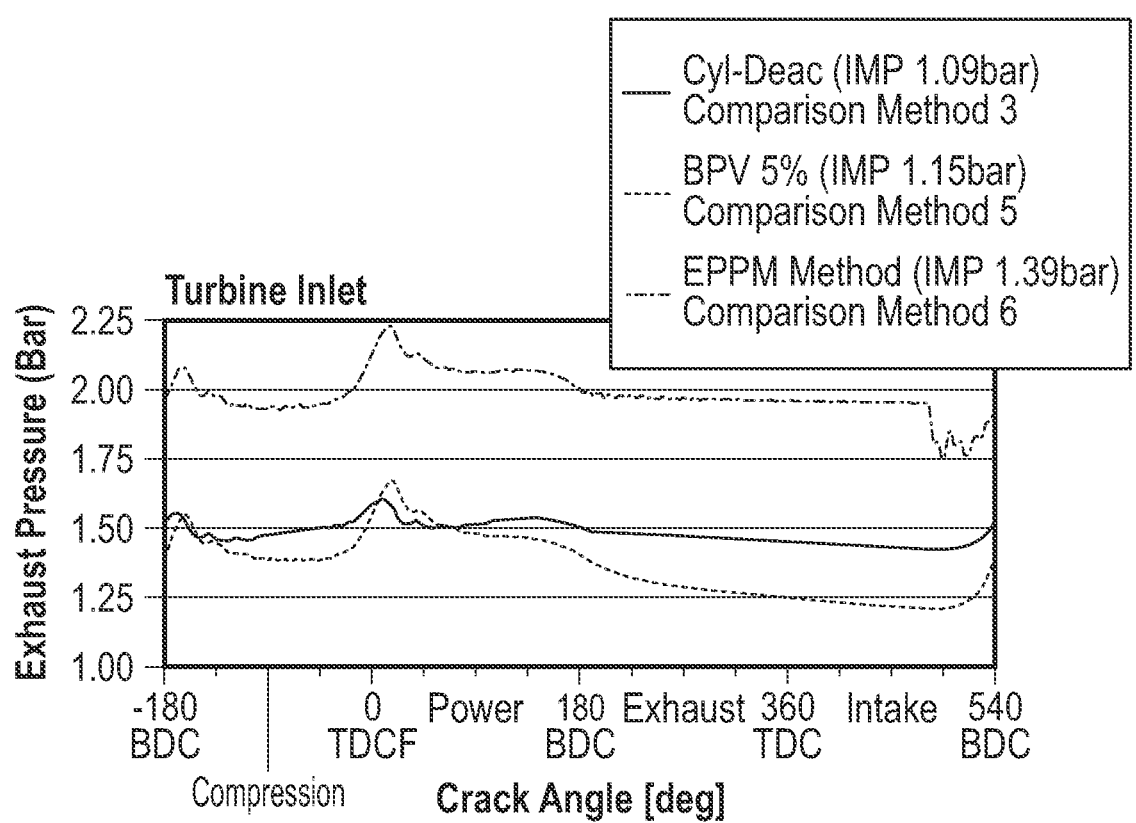
FIGS. 7A-7D show graphs comparing the performance of the engines shown in FIGS. 2 and 4 operating under different comparison methods.
Figure 7B:
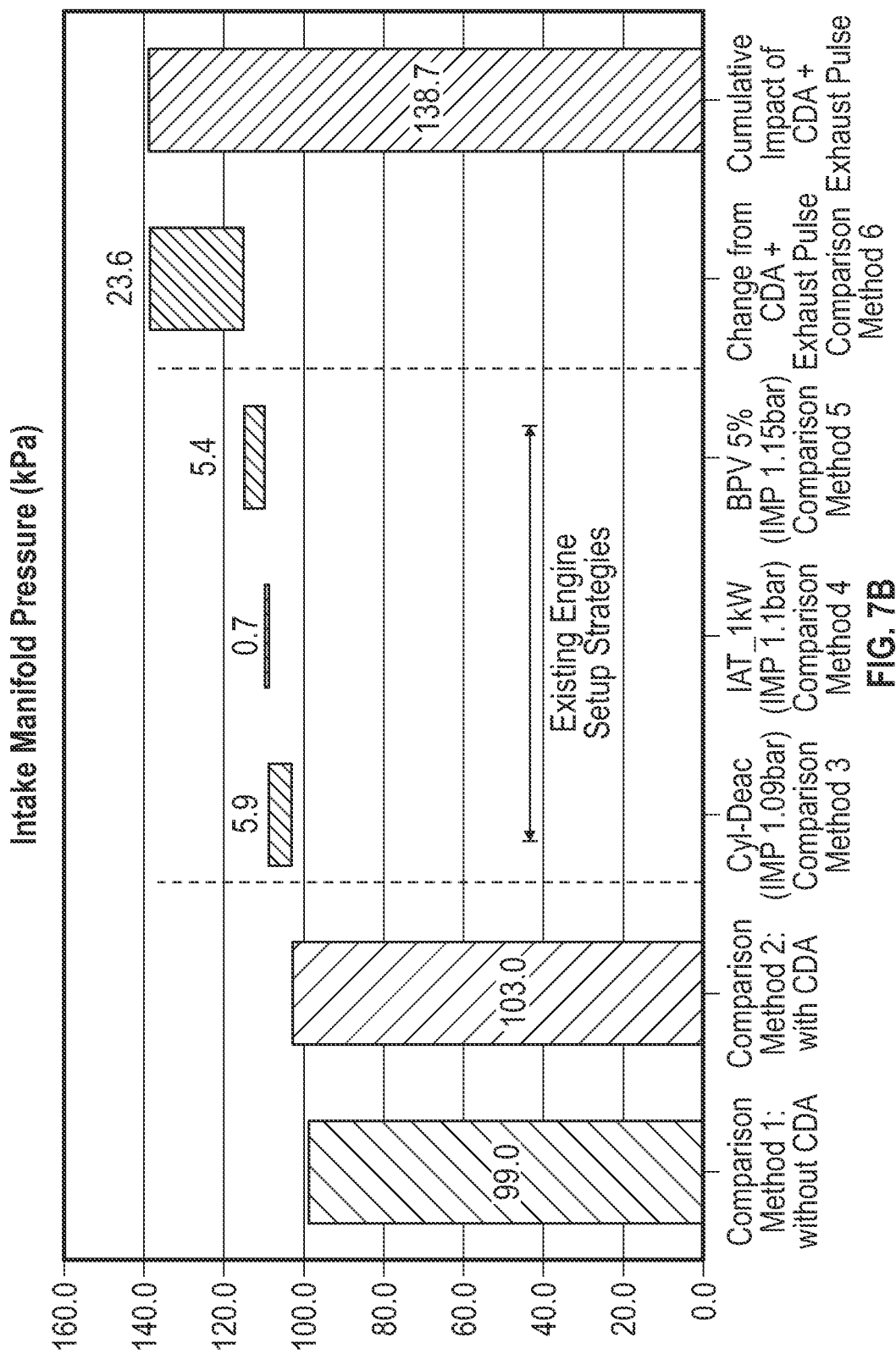
Figure 7C:
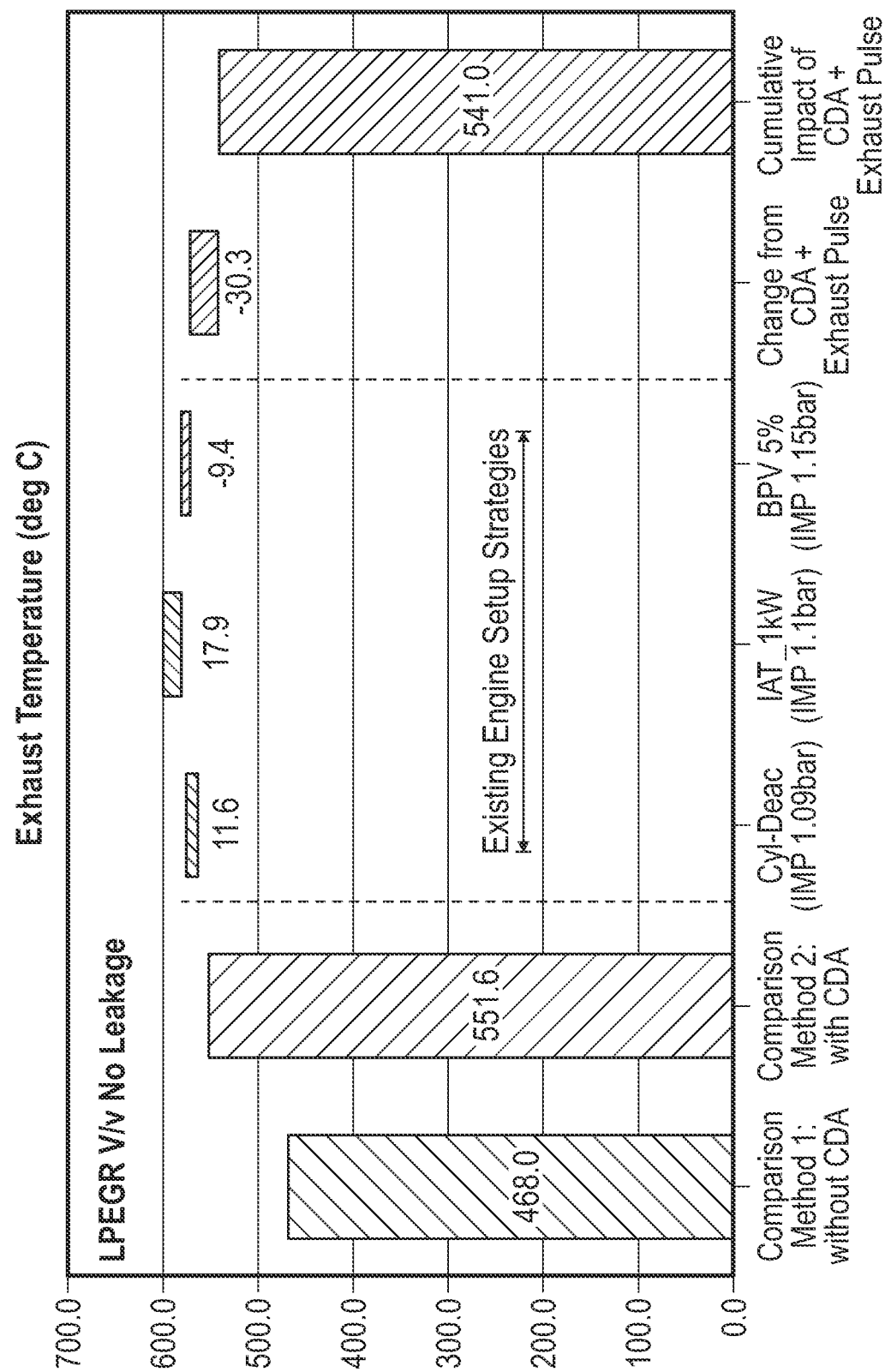

Referring now to FIGS. 7A-7C, performance is shown for the engine 200 shown in FIG. 2 (having an exhaust pulse valve 102) operating under a combination CDA and exhaust pulse method according to embodiments of the present disclosure (Comparison Method 6). In Comparison Method 6, the engine 200 is operated using exhaust pulse in combination with CDA, with the intake air heater powered at 1 kW, and with the backpressure valve 313 at a 5% open position. The performance of engine 200 operating using Comparison Method 6 is compared to the performance of the comparison engine 300 operating under Comparison Methods 1-5. By using the combination CDA and exhaust pulse method according to embodiments of the present disclosure, where an exhaust pulse valve was added between the exhaust manifold and turbine inlet, the total intake air through the engine system was increased beyond any increase resulting from Comparison Methods 3-5.

FIG. 7A shows pressure traces at the exhaust manifold plumbing adjacent to the turbine inlet relative to the crankshaft rotational position for Comparison Methods 3, 5, and 6. As shown in FIG. 7A, exhaust pressure at the turbine inlet spikes near crank angles of −180 and 10 degrees, which aligns with the exhaust flow exiting from operating cylinders 2 and 3, respectively. In Comparison Method 3, due to low in-cylinder trapped flow, marginal pressure spikes are noted at the turbine inlet. In Comparison Method 5, the engine flow increases leading to a moderate increase in the pressure spikes at the turbine inlet. In Comparison Method 6, operation of the exhaust pulse valve provides a strong pressure spike at the turbine inlet to significantly increase in exhaust flow. Also shown in FIG. 7A, in Comparison Method 6, the instantaneous dip in the turbine inlet pressure near the crank angle of 540 degrees is due to the opening of the exhaust pulse valve leading to a dip in the pressure and then recovered due to exhaust flow from cylinders 2 and 3. Using comparison Methods 3 and 5, a cycle-averaged exhaust pressure near an average of 1.36 bar was able to be maintained. In contrast, when using Comparison Method 6, the exhaust pressure was maintained at a much higher pressure (avg. 1.98bar), resulting in a significantly higher expansion ratio across the turbine. This strategy enabled a significant increase in boost pressure, thus increasing the total intake air flow through the engine system with Comparison Method 6.

FIG. 7B shows the contribution of the boost pressure (measured at the intake manifold) rise from Comparison Method 6 compared to Comparison Methods 1-5. Comparison Method 6, which used a combination CDA and exhaust pulse method according to embodiments of the present disclosure, was the most effective in raising the boost pressure (~24 kPa improvement).

FIG. 7C shows the improvement of exhaust temperature when using Comparison Method 6 compared to Comparison Methods 1-5. With the increased flow provided by Comparison Method 6, the air-fuel ratio was raised and maintained near ~18, causing a slight drop in the exhaust temperature. Due to the available buffer in the air-fuel ratio, the temperature can be further raised by increasing the fuel injection quantity, if desired. For the comparison performance, the air-fuel ratio was maintained as lean as possible and higher than the threshold air-fuel ratio limit of 15.7.

Figure 7D:
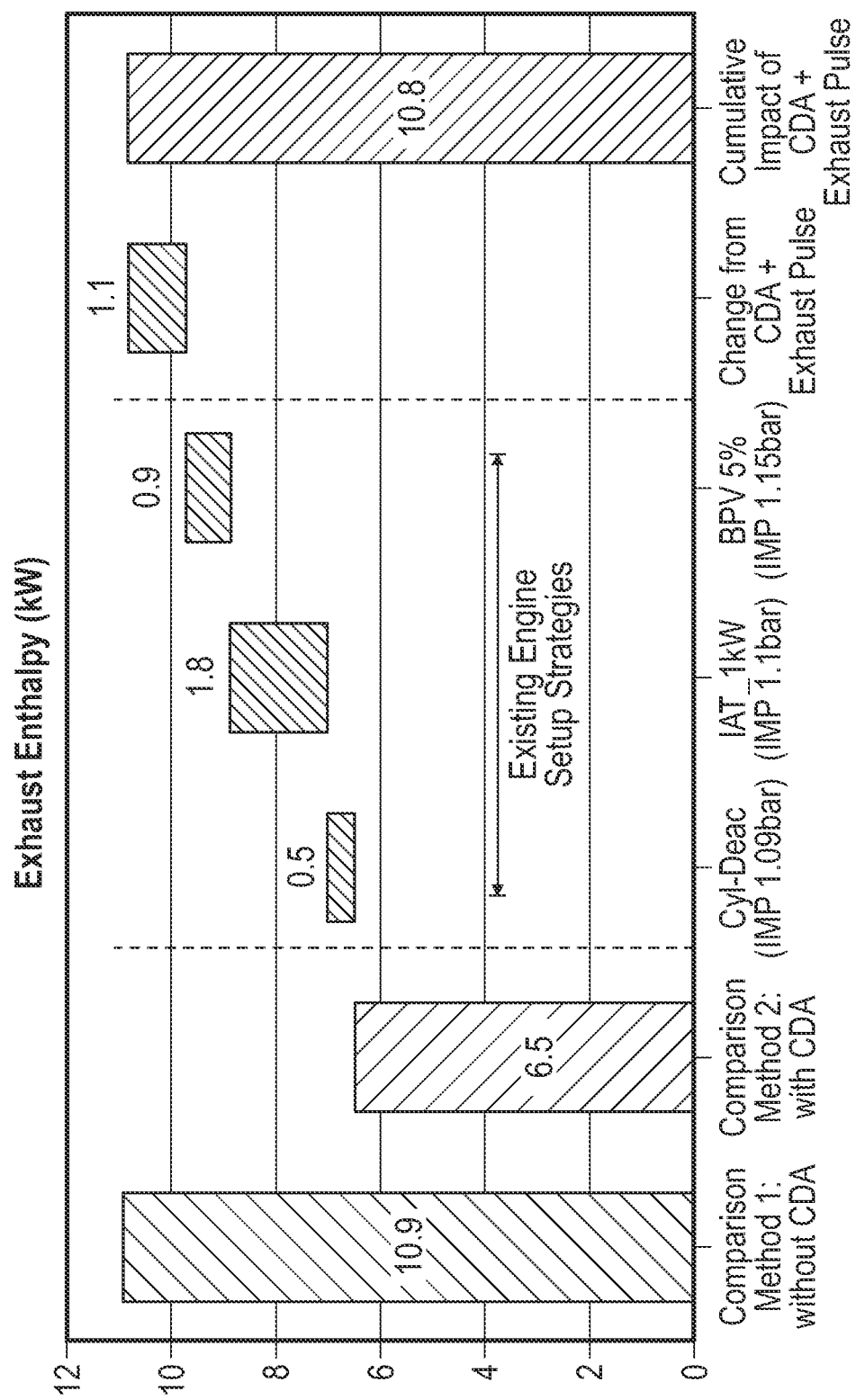

FIG. 7D shows the improvement of exhaust enthalpy when using Comparison Method 6 compared to Comparison Methods 1-5. As shown, Comparison Method 6 showed significant improvement in exhaust enthalpy (1.1 kW) while enabling leaner air-fuel combustion. It is noteworthy that the cumulative impact of Comparison Method 6 recovered most of the exhaust enthalpy by raising the total intake exhaust flow. As a result, Comparison Method 6 demonstrated comparable exhaust temperature and exhaust enthalpy as if the engine was operating with all cylinders activated, as using Comparison Method 1.

Table 1, below, assimilates the cycle-averaged engine performance for each comparison performance strategy and highlights the benefit of the exhaust pulse methodology.

TABLE 1

| Strategy | Unit | Comp. Method 1 | Comp. Method 2 | Comp. Method 3 | Comp. Method 4 | Comp. Method 5 | Comp. Method 6 |
|---|---|---|---|---|---|---|---|
| Engine RPM | RPM | 1400 | 1400 | 1400 | 1400 | 1400 | 1400 |
| Fuel flow | mg | 20.0 | 25.9 | 27.6 | 33.9 | 37.5 | 40.0 |
| Brake mean effective pressure | bar | 3.70 | 2.99 | 3.17 | 4.05 | 5.00 | 5.30 |
| Air flow | kg/h | 73.89 | 34.49 | 36.69 | 44.70 | 49.69 | 60.51 |
| Air-fuel ratio | — | 21.99 | 15.82 | 15.72 | 15.58 | 15.58 | 18.01 |
| Intake manifold pressure | bar | 0.99 | 1.03 | 1.09 | 1.10 | 1.15 | 1.39 |
| Indicated mean effective pressure | bar | 6.22 | 3.71 | 3.99 | 5.10 | 5.70 | 6.19 |
| Total residual gas | % | 10.8 | 5.9 | 6.4 | 6.4 | 4.4 | 5.1 |

As shown in Table 1, using Comparison Method 6 with engine 200 according to embodiments of the present disclosure allowed for increased fuel flow, increased brake mean effective pressure (BMEP), and increased intake manifold pressure (IMP) when compared to Comparison Methods 1-5. Additionally, using Comparison Method 6 with engine 200 according to embodiments of the present disclosure allowed for an air flow rate, an air-fuel ratio, and an indicated mean effective pressure that is close to that when using Comparison Method 1 (with all cylinders activated) on comparison engine 200 (without an exhaust pulse valve).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
    operating an engine, comprising:
        multiple cylinders comprising at least one deactivated cylinder and at least one activated cylinder;
        multiple intake valves, wherein each intake valve is positioned in an intake port of each of the multiple cylinders; and
        multiple exhaust valves, wherein each exhaust valve is positioned in an exhaust port of each of the multiple cylinders;

deactivating the at least one deactivated cylinder, comprising:
  deactivating each of the multiple intake valves and each of the multiple exhaust valves to each of the at least one deactivated cylinder;
operating the at least one activated cylinder, comprising:
  operating each of the multiple intake valves and each of the multiple exhaust valves to each of the at least one activated cylinder according to a valve timing schedule;
actuating an exhaust pulse valve positioned along an exhaust main passage fluidly connected between a turbine inlet to a turbocharger and the multiple exhaust valves, the actuating comprising:
  fully opening the exhaust pulse valve when at least one of the multiple exhaust valves to the at least one activated cylinder is open; and
  fully closing the exhaust pulse valve when each of the multiple exhaust valves to the at least one activated cylinder is closed.

2. The method of claim 1, further comprising using a computer system to deactivate the at least one deactivated cylinder and to operate the at least one activated cylinder, wherein the computer system is in communication with the multiple intake valves, the multiple exhaust valves, and the exhaust pulse valve.

3. The method of claim 2, further comprising using the computer system to control a fuel system in the engine, wherein controlling the fuel system comprises:
  deactivating fueling to the at least one deactivated cylinder; and
  providing fuel into the at least one activated cylinder.

4. The method of claim 1, further comprising:
  directing air from a compressor section of the turbocharger through an intake line to the multiple intake valves; and
  using exhaust flow through the turbine inlet to rotate a compressor in the compressor section of the turbocharger to increase a flow rate of the air from the compressor section.

5. The method of claim 1, wherein the multiple exhaust valves to the at least one activated cylinder are opened and closed in a sequential order.

6. The method of claim 1, further comprising providing an air to fuel ratio in the at least one activated cylinder ranging from 15.7 to 19.

7. The method of claim 1, further comprising directing exhaust flow from the multiple cylinders through the exhaust pulse valve to a bypass line when the exhaust pulse valve is fully opened.

8. A method, comprising:
operating an engine, the engine comprising:
  multiple cylinders, the multiple cylinders comprising multiple pistons, wherein each of the multiple pistons is slidably positioned within each of the multiple cylinders;
  multiple intake valves, wherein each of the multiple intake valves is positioned in an intake port of each of the multiple cylinders;
  multiple exhaust valves, wherein each of the multiple exhaust valves is positioned in an exhaust port of each of the multiple cylinders;
  a crankshaft is connected to each of the multiple pistons; and
  an exhaust pulse valve positioned along an exhaust main passage fluidly connected between the multiple exhaust valves and a turbine inlet of a turbocharger;
rotating the crankshaft in the engine;
while the crankshaft is rotating during a first portion of an engine cycle, keeping the exhaust pulse valve in a fully open position to allow exhaust flow from the multiple cylinders to the turbocharger; and
while the crankshaft is rotating during a remaining portion of the engine cycle, keeping the exhaust pulse valve in a fully closed position to block the exhaust flow from the multiple cylinders.

9. The method of claim 8, wherein during the engine cycle, at least two of the multiple cylinders are deactivated.

10. The method of claim 8, wherein during the first portion of the engine cycle, at least two of the multiple exhaust valves are opened and closed in a sequential order.

11. The method of claim 8, wherein during the remaining portion of the engine cycle, each of the multiple exhaust valves are in a closed position.

12. The method of claim 8, further comprising providing an air to fuel ratio in at least one of the multiple cylinders ranging from 15.7 to 19.

13. An engine, comprising:
a turbocharger comprising a turbine section;
multiple cylinders, wherein each cylinder comprises a combustion chamber and a piston slidably positioned in the cylinder;
multiple exhaust valves, wherein each exhaust valve is positioned in an exhaust port of each of the multiple cylinders;
exhaust branch passages fluidly connecting the multiple exhaust valves to an exhaust pulse valve;
an exhaust main passage fluidly connecting the exhaust pulse valve to a turbine inlet of the turbine section of the turbocharger; and
a computer system having a non-transitory computer readable medium in communication with the multiple exhaust valves and the exhaust pulse valve, the non-transitory computer readable medium storing instructions comprising functionality for:
  actuating the exhaust pulse valve to a fully open position when at least one of the multiple exhaust valves is open, wherein when the exhaust pulse valve is in the fully open position, the exhaust branch passages are in fluid communication with the exhaust main passage; and
  actuating the exhaust pulse valve to a fully closed position when the multiple exhaust valves are closed, wherein when the exhaust pulse valve is in the fully closed position, the exhaust branch passages are sealed from the exhaust main passage.

14. The engine of claim 13, wherein the instructions further comprise functionality for keeping at least one of the multiple cylinders deactivated while the engine is running.

15. The engine of claim 13, further comprising multiple intake valves, wherein each intake valve is positioned in an intake port of each of the multiple cylinders.

16. The engine of claim 14, further comprising at least one intake line fluidly connecting a compressor section of the turbocharger to the multiple intake valves.

17. The engine of claim 15, wherein the at least one intake line comprises a high temperature intake line and a low temperature intake line.

18. The engine of claim 15, wherein at least one charge air cooler is provided along the at least one intake line.

19. The engine of claim 13, further comprising an exhaust outlet line fluidly connected to a turbine outlet of the turbine section of the turbocharger.

20. The engine of claim 19, further comprising:
a bypass line fluidly connecting the exhaust main passage to the exhaust outlet line; and
a bypass valve positioned along the bypass line.

\* \* \* \* \*